United States Patent [19]

Kreider

[11] Patent Number: 5,215,597
[45] Date of Patent: Jun. 1, 1993

[54] METHOD FOR BONDING THIN FILM THERMOCOUPLES TO CERAMICS

[75] Inventor: Kenneth G. Kreider, Potomac, Md.

[73] Assignee: The United States of America as represented by the United States Department of Energy, Washington, D.C.

[21] Appl. No.: 390,851

[22] Filed: Aug. 8, 1989

[51] Int. Cl.$^5$ .................................................. H01L 35/28
[52] U.S. Cl. ...................................... 136/225; 136/200; 136/230
[58] Field of Search ............... 136/200, 201, 212, 225, 136/230

[56] References Cited

U.S. PATENT DOCUMENTS

| | | | |
|---|---|---|---|
| 3,006,978 | 10/1961 | McGrath et al. | 148/6 |
| 3,890,456 | 7/1975 | Dils | 428/216 |
| 3,911,386 | 10/1975 | Beaudoin et al. | 338/34 |
| 4,040,929 | 8/1977 | Bauer et al. | 204/195 S |
| 4,050,956 | 9/1977 | de Bruin et al. | 148/6 |
| 4,153,518 | 5/1979 | Holmes et al. | 204/38 B |
| 4,238,957 | 12/1980 | Bailey et al. | 73/343 R |
| 4,253,931 | 3/1981 | Gold et al. | 204/192 SP |
| 4,342,632 | 8/1982 | Heim et al. | 204/192 EC |
| 4,512,863 | 4/1985 | Criss et al. | 204/192 R |
| 4,559,277 | 12/1985 | Ito | 428/627 |
| 4,563,400 | 1/1986 | Criss et al. | 428/630 |

Primary Examiner—Donald P. Walsh
Assistant Examiner—Chrisman D. Carroll
Attorney, Agent, or Firm—Virginia B. Caress; William R. Moser; Richard E. Costant

[57] ABSTRACT

A method is provided for adhering a thin film metal thermocouple to a ceramic substrate used in an environment up to 700 degrees Centigrade, such as at a cylinder of an internal combustion engine. The method includes the steps of: depositing a thin layer of a reactive metal on a clean ceramic substrate; and depositing thin layers of platinum and a platinum-10% rhodium alloy forming the respective legs of the thermocouple on the reactive metal layer. The reactive metal layer serves as a bond coat between the thin noble metal thermocouple layers and the ceramic substrate. The thin layers of noble metal are in the range of 1-4 micrometers thick. Preferably, the ceramic substrate is selected from the group consisting of alumina and partially stabilized zirconia. Preferably, the thin layer of reactive metal is in the range of 0.015-0.030 micrometers (15-30 nanometers) thick. The preferred reactive metal is chromium. Other reactive metals may be titanium or zirconium. The thin layer of reactive metal may be deposited by sputtering in ultra high purity argon in a vacuum of approximately 2 milliTorr (0.3 Pascals).

1 Claim, 1 Drawing Sheet

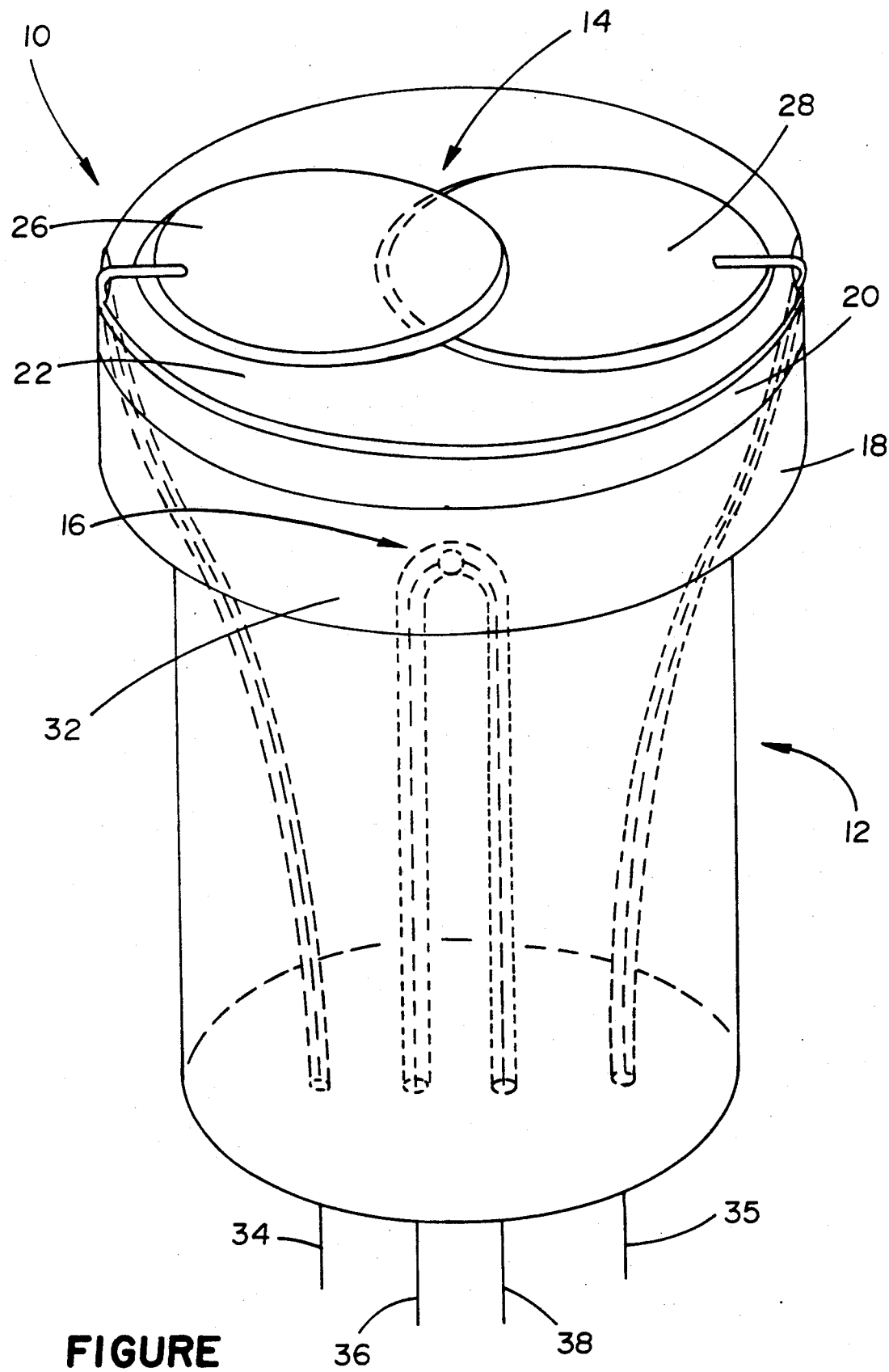
FIGURE

METHOD FOR BONDING THIN FILM THERMOCOUPLES TO CERAMICS

The United States Government has rights in this invention pursuant to Contract No. DE-AI05-830R21375 between the United States Department of Energy and the United States Department of Commerce.

BACKGROUND OF THE INVENTION

The present invention relates to the field of measuring temperature in high temperature environments, and more particularly to measuring high temperatures with thin film thermocouples. Most particularly, the invention relates to thin film thermocouples bonded to ceramic substrates exposed to high temperatures.

Internal combustion engines generally operate at high temperature. The temperatures in the combustion chambers are especially high. Presently, ceramic insulating materials are incorporated as thermal barrier coatings or linings in internal combustion engines in order to minimize cooling losses and achieve higher engine operating efficiency and higher power to weight ratios.

Ceramic materials including aluminum oxide and partially stabilized zirconia may be employed for the thermal barrier coatings or linings. The effective use of these materials as thermal barrier coatings or linings requires detailed knowledge of the temperature characteristics of the coatings or linings under combustion conditions.

To obtain the desired detailed knowledge of the temperature characteristics, heat flux meters based on sandwiched thin film thermocouples can be used. Such thermocouples provide detailed heat transfer information with respect to heat transfer in the engine.

Prior art thin film thermocouples include a nickel-iron thermocouple developed for gun barrel measurements. However, these sensors lack reasonable durability in diesel engines and do not accurately reproduce the thermal environment of the engine having thermal barrier coatings.

The development of sputtered thin film thermocouples based on noble metals has led to thermocouples that can operate in the harsh environment of a combustion chamber. This is due, in part, to the stability of the noble metals in the harsh environment. Such noble metal thin film thermocouples also provide fast and accurate response due to their low mass (less than 1 mg) and their flexibility of application to a surface where the thermal measurement is needed. See:

(1) H. P. Grant, J. S. Przybyszewski, and R. G. Claing, NASA CR-165201, 17 Mar. 1981;

(2) H. P. Grant, J. S. Przybyszewski, and R. G. Claing, and W. L. Anderson, NASA CR-165476, 11 Jan. 1982;

(3) K. G. Kreider, S. Semancik, and C. Osen, Advanced Thin Film Thermocouples, IR84-2949 (National Bureau of Standards, Washington, D.C., 1984); and (4) K. G. Kreider and S. Semancik, J. Vac. Technol. A 3, 2582 (1985).

There is, however, a significant problem in the application of noble metal thin film thermocouples in measuring the surface temperature of a ceramic, especially a thermal barrier coating in an internal combustion engine, up to 700 Deg. C.; and that problem is the poor adherence of the thermocouple to the ceramic. It would be desirable, therefore, to provide a method of making thin film noble metal thermocouples that readily adhere to ceramic substrates subject to high temperatures. More particularly, it would be desirable to provide a method of making thin film noble metal thermocouples that readily adhere to ceramic substrates subject to high temperatures. More particularly, it would be desirable to provide a method for improving the adherence of thin film noble metal thermocouples to ceramic thermal barrier coatings or linings used in internal combustion engines, especially diesel engines.

In a technical program of the Society of Automotive Engineers, a paper was presented entitled "Heat Transfer in a Cooled and Insulated Engine" by Thomas Morrell from Integral Technologies, Inc.. The paper was published approximately Feb. 25, 1989. The paper reported that certain undisclosed thermocouples allowed the temperature measurement of the inside of a diesel engine lined with ceramics. However, no disclosure was made of the method of bonding the thermocouple to the ceramic engine lining.

It is noted that in an A.I.Ch.E. symposium on sensors, in October 1988, the method of the present invention, of adhering a thin film noble metal thermocouple to a ceramic lining in an internal combustion engine, was disclosed.

SUMMARY OF THE INVENTION

Accordingly, it is a primary object of the present invention to provide a method for improving the adherence of thin film noble metal thermocouples to ceramic thermal barrier coatings or linings used in internal combustion engines, especially diesel engines.

Another object of the invention is to provide a method for improving the adherence of thin film noble metal thermocouples to ceramic substrates generally.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a method is provided for adhering a thin film metal thermocouple to a ceramic substrate used in an environment up to 700 degrees Centigrade, such as at a cylinder of an internal combustion engine, especially a diesel engine. The method includes the steps of: depositing a thin layer of a reactive metal on a clean ceramic substrate; and depositing thin layers of metal forming the legs (of discs) of the thermocouple on the reactive metal layer. The reactive metal layer serves as a bond coat between the thin metal thermocouple layers and the ceramic substrate.

Preferably, the thin film metal thermocouple includes one leg (or disc) composed of a first noble metal composition and a second leg (or disc) composed of a second noble metal composition. For example, one leg (or disc) may be composed of platinum, and the other leg (or disc) may be composed of an alloy of platinum and 10% rhodium or the other leg (disc) may be selected from the group consisting of gold, iridium, or palladium. The thin layers of noble metal are deposited by sputtering.

Preferably, the thin layers of noble metal are in the range of 1-4 micrometers thick.

Preferably, the ceramic substrate is selected from the group consisting of alumina and partially stabilized zirconia. The ceramic substrate is cleaned by degreasing with a solvent, by acid treatment, and by rinsing with deionized water.

With respect to the partially stabilized zirconia, it is well known that zirconium oxide undergoes several phase transformations as it cools off from a melt. By adding from 5-10% calcium oxide or yttrium oxide, the cubic form of zirconia is stabilized at all temperatures. By adding somewhat less than the 5-10% of the calcium oxide or yttrium oxide, the zirconia is partially stabilized. Such partially stabilized zirconia is sometimes referred to as transformation toughened zirconia. The partially stabilized zirconia has greater impact resistance and exhibits less brittleness than either zirconia or stabilized zirconia.

Preferably, the thin layer of reactive metal is in the range of 0.015-0.030 micrometers (15-30 nanometers) thick. The preferred reactive metal is chromium. Other reactive metals may be titanium or zirconium. The thin layer of reactive metal may be deposited by sputtering in ultra high purity argon in a vacuum of approximately 2 milliTorr (0.3 Pascals).

In accordance with another aspect of the invention, a thermocouple sensor assembly is provided which includes a sensor body which includes a thin film surface thermocouple and an interior thermocouple, where the sensor body is designed for measuring temperatures at the cylinder walls of an internal combustion engine. More specifically, the sensor body includes a portion for supporting a ceramic substrate. The ceramic substrate is supported by the body portion. A thin layer of reactive metal is deposited on the ceramic substrate. A surface thermocouple assembly comprised of a thermocouple layer is deposited on the reactive metal layer. The surface thermocouple assembly includes thin layers of disparate noble metal compositions deposited on the reactive metal layer. Whereby the reactive layer serves as a bond layer to adhere the noble metal layers to the ceramic substrate. An interior thermocouple assembly is also provided and is supported by an interior portion of the sensor body.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

The sole FIGURE depicts a thermocouple sensor assembly which includes a surface thin film noble metal thermocouple and an interior thermocouple, wherein the sensor assembly is designed to measure temperatures in the cylinder walls of internal combustion engines.

DETAILED DESCRIPTION

With reference to the drawing FIGURE, a thermocouple sensor assembly 10 is provided which includes a sensor body 12 which includes a thin film surface thermocouple assembly 14 and an interior thermocouple 16. The sensor body 12 is round and is designed for measuring temperatures at cylinder walls of an internal combustion engine, especially a diesel engine, by fitting into a round hole near or in the cylinder wall. The sensor assembly 10 can also be in the form of a plug that can replace one of the intake valves of a diesel engine.

The sensor body 12, as in known in the prior art, is preferably made of iron metal when the assembly 10 fits into an iron-based diesel engine. More specifically, the iron metal of the sensor body 12 is made from the same iron that the diesel casting is made from so that the sensor body 12 and the diesel engine have similar thermal properties.

The sensor body 12 includes a portion 18 for supporting a ceramic substrate 20 which is a plasma sprayed partially stabilized zirconia. A thin layer 22 of reactive metal, e.g. chromium, (drawn larger than scale for purposes of illustration) is deposited on the ceramic substrate 20.

A surface thermocouple assembly 14 is deposited on the reactive metal layer 22. The surface thermocouple assembly 14 includes layers of disparate noble metal compositions. More specifically, the surface thermocouple assembly 14 includes a first disc which is a thin layer 26 of platinum and a second disc which is a thin layer 28 of a platinum-10% rhodium alloy deposited on the reactive metal layer 22. Whereby the reactive metal layer 22 serves as a bond layer to adhere the noble metal layers 26 and 28 to the ceramic substrate 20.

An interior thermocouple assembly 16, as is known in the prior art, is also provided and is supported by an interior portion 32 of the sensor body 12. The interior thermocouple assembly 16 allows measurement of heat transfer from the thin film thermocouple assembly 14 at the surface facing the combustion chamber to the other side of the ceramic substrate 20 where the interior assembly 16 is located. The interior assembly 16 is a commercially available, Type S thermocouple that employs wire thermocouple legs comprised of Pt/Pt-10%Rh.

High temperature resistant conductors such as type s extension wires 34 and 35 connect the surface thermocouple assembly 14 to external electronic circuitry (not shown). Similarly, conductors 36 and 38 connect the interior thermocouple assembly 16 to external electronic circuitry.

Before deposition of the surface thermocouple assembly 14, the ceramic substrate 20 is first cleaned by standard cleaning techniques. More specifically, the ceramic substrate 20 is degreased with acetone followed by methanol and water rinses. Then the ceramic substrate 20 is dipped into hydrofluoric acid or hydrochloric acid followed by a rinsing with deionized water.

To deposit the reactive chromium layer 22, the clean ceramic substrate 20 is subjected to sputter deposition of reactive chromium in ultra high purity argon (99.999%) in a vacuum (at a pressure of 2 milliTorr (0.3 Pascals) after a $10^{-3}$ Pascal pumpdown. The thickness of the reactive chromium layer 22 is controlled to be in the range of 0.015 to 0.030 micrometers.

Immediately after the reactive chromium layer 22 is deposited, the first and second discs 26 and 28 of the disparate noble metal compositions (platinum composition and platinum-10% rhodium composition, respectively) are sputter deposited on the reactive layer 22 to form the surface thermocouple assembly 14.

The deposition of the surface thin films of platinum-containing compositions takes place immediately after deposition of the reactive chromium layer 22 in order to prevent or limit oxidation or contamination between the layers. The thickness of the thin films of the surface thermocouple assembly 14 is controlled to be in the range of 1 to 4 micrometers.

To evaluate the efficacy of the bonding strength between thin film noble metal thermocouple layers and a ceramic substrate due to the presence of the reactive metal bonding layer of the invention, a number of thin film thermocouple layers were bonded to ceramic substrates, and tests were conducted on those thermocouple layers.

Tables I and II set out test results for different thin film noble metal thermocouple layers made in accordance with the invention.

More specifically, Tables I and II set out the results of adhesion strength tests that were performed using a commercial pull tab epoxy bonded to the noble metal film. The tests measure the strength of adhesion between the noble metal film and the respective ceramic substrates.

TABLE I

Platinum Adhesion to Alumina with Bond Coat

| | Bond Coat Thickness (Micrometers) | Pt Thickness (Micrometers) | Adhesion Strength (Ave) MPa | Psi |
|---|---|---|---|---|
| CrPt | 0.015 | 2.7 | >63 | 9,000 |
| CrPt* | | | >56 | 8,000 |
| CrPt** | | | >48 | 6,820 |
| SiPt | 0.03 | 1.9 | 43 | 6,215 |
| SiPt | | | 44 | 6,250 |
| TiPt | 0.02 | 2.1 | >56 | 8,000 |
| TiPt* | | | 56 | 8,000 |
| ZrPt | 0.03 | 2.4 | >70 | 10,300 |
| ZrPt* | | | >48 | 6,800 |
| ZrPt** | | | >49 | 7,000 |

TABLE II

Platinum Adhesion to Stabilized Zirconia with Bond Coat

| | Bond Coat Thickness (Micrometers) | Pt Thickness (Micrometers) | Adhesion Strength (Ave) MPa | Psi |
|---|---|---|---|---|
| CrPt | 0.015 | 4.2 | >60 | 8,500 |
| CrPt* | | | >52 | 7,500 |
| CrPt | | | >50 | 7,250 |
| TiPt | 0.02 | 3.4 | >47 | 6,750 |
| TiPt* | | | 27 | 3,800 |
| TiPt** | | | 30 | 4,300 |
| ZrPt | 0.03 | 3.2 | >55 | 7,900 |
| ZrPt* | | | >63 | 9,000 |
| ZrPt | 0.03 | 3.1 | 55 | 7,900 |
| ZrPt* | | | 27 | 3,825 |
| ZrPt** | | | 40 | 5,860 |
| SiPt | 0.03 | 3.0 | 44 | 6,215 |
| SiPt* | | | 44 | 6,250 |

>indicates failure in epoxy;
*indicates tested after 3 hours at 530 degrees Centigrade (1,000 deg. F.); and
**indicates tested after 3 hours at 700 degrees Centigrade (1,300 deg. F.).

It is noted that adhesion strengths of the thermocouple layers to the substrate employing the chromium bond coat of the invention are considerably greater than adhesion strengths of thermocouple layers not employing the bond coat. More specifically, adhesion strengths are generally less than 10 megapascals (MPa) without employing the bond coat of the invention. On the other hand, with the invention, adhesion strengths are considerably greater than 40 megapascals (MPa).

As stated above, the thin layer of reactive metal is preferably in the range of 0.015-0.030 micrometers (15-30 nanometers) thick. The upper limit in the thickness of the layer of reactive metal is determined by the fact that it is desirable to avoid imparting too many impurities in the final thermocouple than is necessary. More particularly, the reactive metal undergoes oxidation, either immediately upon deposition, or later, upon exposure to high temperature measurements by the thermocouple. When the reactive metal layer is not too thick, and when the reactive metal undergoes oxidation, the reactive metal is pulled away from the noble metal layer and is precipitated as an oxide, whereby it does not distort the output of the thin film noble metal thermocouple. On the other hand, if the reactive metal layer were too thick, some of the reactive metal would infiltrate into the noble metal layer, and distortion of thermocouple output may occur.

The lower limit of thickness of the reactive metal layer is determined by factors difficult to quantify, such as surface roughness.

In summary, numerous benefits have been described which result from employing the principals of the invention. Most significantly, with the invention, a method is provided for improving the adherence of thin film noble metal thermocouples to ceramic substrates that may be used for measuring temperatures in diesel engine combustion chambers. More specifically, the novel thin film noble metal thermocouples of the invention may be used with thermal barrier coatings or linings used in internal combustion engines. Also, with the invention, a method is provided for improving the adherence of high temperature thin film noble metal thermocouples to ceramic substrates generally, especially for thermocouples used in high temperature applications up to 700 degrees Centigrade.

The foregoing description of the invention has been presented for purposes of illustration and description. It is not intended to be exhaustive or to limit the invention to the precise form disclosed. Obvious modifications or variations are possible in light of the above teachings. For example, the thin layer of reactive metal may be deposited by physical evaporation or by electron beam evaporation.

The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An assembly suitable for measuring temperatures up to 700 degrees Centigrade at the cylinder walls in an internal combustion engine, comprising:
   a substrate comprised of a ceramic selected from the group consisting of alumina and partially stabilized zirconia and mixtures thereof,
   a thin layer of reactive metal deposited on said ceramic substrate, said reactive metal selected from the group consisting of chromium, titanium, and zirconium, and a thin thermocouple layer comprised of a thin layer of platinum metal and a thin layer of platinum-rhodium alloy deposited on said reactive metal layer, whereby said reactive metal layer serves as a bond layer for adhering said noble metal layers to said substrate.

* * * * *